United States Patent

[11] 3,629,978

| [72] | Inventor | Loring Coes, Jr.<br>Princeton, Mass. |
|---|---|---|
| [21] | Appl. No. | 30,004 |
| [22] | Filed | Apr. 20, 1970 |
| [45] | Patented | Dec. 28, 1971 |
| [73] | Assignee | Norton Company<br>Worcester, Mass. |

[54] APPARATUS WITH SELECTIVELY RIGID AND FLEXIBLE SUPPORT CABLE
12 Claims, 9 Drawing Figs.

[52] U.S. Cl............................................. 51/126,
51/99, 248/17
[51] Int. Cl............................................. B24b 7/00,
F16m 1/00
[50] Field of Search............................................. 77/15;
248/17; 51/99, 126

[56] References Cited
UNITED STATES PATENTS
1,966,930  7/1934  Leander.......................... 51/99
2,073,400  3/1937  Cumming..................... 51/126

*Primary Examiner*—Harold D. Whitehead
*Attorney*—Walter Fred

ABSTRACT: An easily manually operated, positioned, and controlled apparatus having a fluid pressure system to drive and/or feed a tool into a workpiece. A toolhead is pivotally supported, for movement in various directions, at an end of an unsupported portion of a normally rigid movable composite cable extending longitudinally above a floor from between guide rollers mounted on a support. The composite cable is rigidified by a radially compressed bundle of flexible strands of wires held in frictional engagement by the contracting force of a resilient flexible tube expanded thereover. Hence, the composite cable acts like a solid shaft providing greater resistance to bending by the fluid pressure feed means. Fluid under pressure is admitted to inflate the resilient tube and separate the wires whereby the composite cable is easily flexed to position the toolhead adjacent the workpiece whereupon the fluid pressure is turned off to rigidify the flexed composite cable to retain the toolhead in the desired position and feed the tool therefrom.

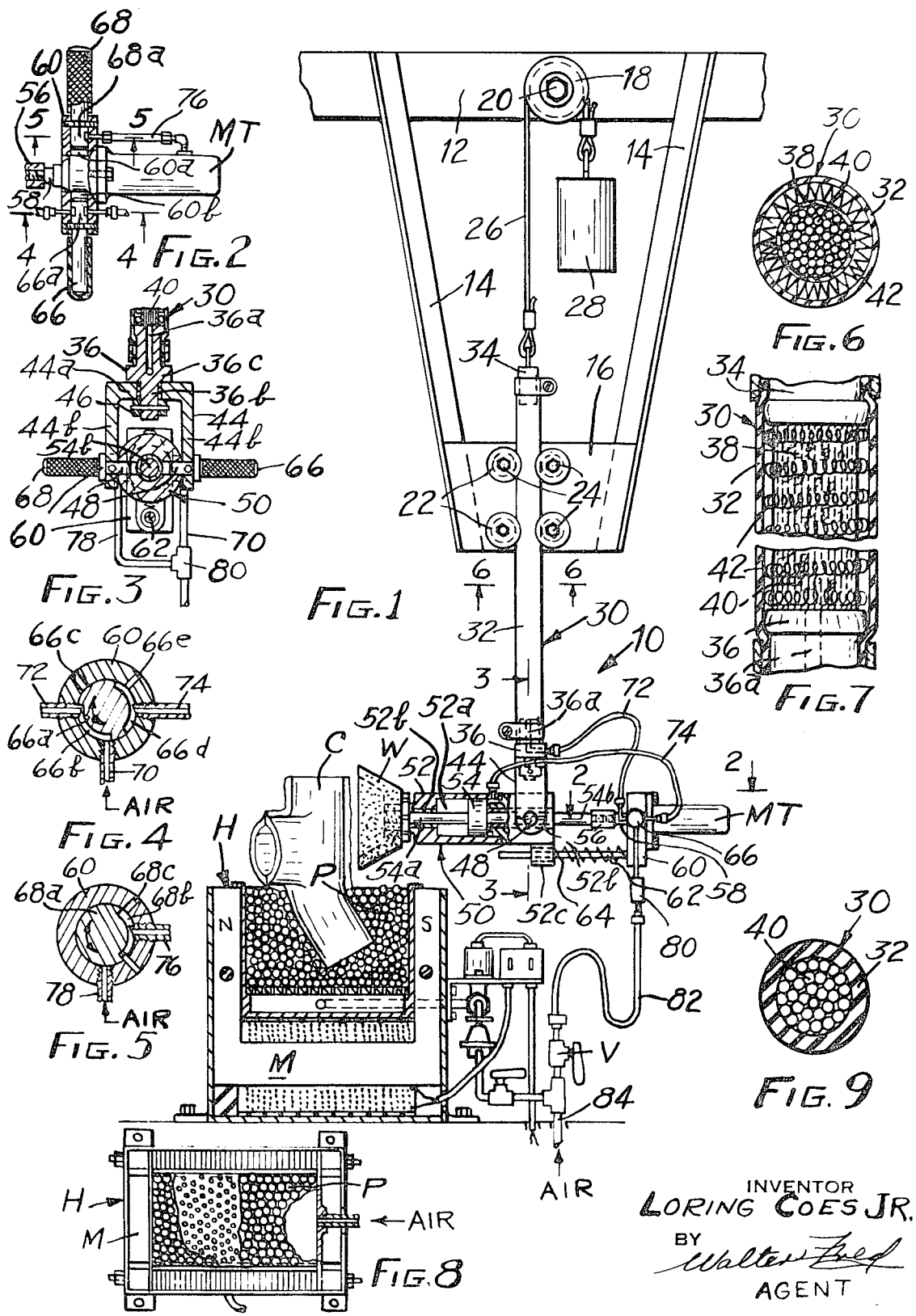

APPARATUS WITH SELECTIVELY RIGID AND FLEXIBLE SUPPORT CABLE

CROSS-REFERENCE TO RELATED APPLICATIONS

This invention is one partially disclosed but not claimed copending application disclosing an invention disclosed but not claimed in this application.

BACKGROUND OF THE INVENTION

1. Field of Invention

The invention relates to a manually operated apparatus, such as, but not limited to a foundry snagging grinder shown by example and particularly to an easily manipulated apparatus to power feed and drive a tool mounted on a toolhead pivotally and rotatably supported at an end of a rigidified composite cable adapted to be fluidized and bent to position the toolhead.

2. Description of the Prior Art

At the present time many foundry snagging grinding and similar operations where a tool performs work by engaging a workpiece or the like are preformed with hand-held portable grinders or devices and hand-fed floor stand grinders or machines. These grinding or similar operations are inefficient costly ways of removing metal, doing work, and utilizing manpower. The metal removal or work rate and production depends greatly on the strength and stamina of the operator. Obviously, hand-feeding workpieces into a tool or hand supporting and feeding a portable grinder or tool into a workpiece is tiresome; therefore, the operators efficiency gradually drops off, he rests more frequently, and the working time is reduced.

The applicant has greatly alleviated those problems by providing an improved power fed grinder or tool which has substantially the mobility of a portable grinder or device but requires very little effort on the part of the operator to position and operate. As a result the operator is able to work longer with less rest, production increases, material is removed faster from the castings, and foundry and other undesirable jobs are made more attractive to those seeking employment. More pressure can be applied than heretofore possible with a hand-fed portable grinder or device, and the applicant's grinder or apparatus can be and is preferably used with work holders which rigidly hold the castings or other workpieces. Much of the work performed on floor stand grinders or machines could be done by the applicant's grinder or apparatus used in combination with a work holder.

The applicant is not aware of apparatus or a snagging grinder of this type on the market or disclosed in the prior art. It is well known to rotate and to feed a grinding wheel or tool with powered devices such as fluid motors and cylinders. However, this invention provides in combination therewith a unique support cable which can be made rigid to enable various power and fluid pressure feed means to be utilized and which is made flexible when it is desired to position or relocate the grinder or apparatus.

SUMMARY OF THE INVENTION

The invention comprises a toolhead supported at an unsupported end of a rigidified cable extending longitudinally above a floor from a supporting structure. Within the toolhead are piston rods or drive shafts extending from opposite sides of a piston slideably and rotatably mounted in a fluid pressure cylinder. The toolhead is pivotally mounted on means attached to the cable for relative movement about a first pivot axis and for rotational movement about a longitudinal axis of the cable normal to the first pivot axis. The composite cable comprises a bundle of wires held in radial compression and frictional engagement by the tension of a resilient member expanded around the bundle. A grinding wheel or tool is mounted on a piston rod or drive shaft, extending out of the cylinder and coupled to the drive shaft of a fluid pressure or other power-driven motor. The motor is fixedly mounted on a support plate slideable in a slideway on the cylinder. A return spring between the cylinder and the support plate bias the support to retract the piston and the grinding wheel from engagement with the workpiece.

Rotatably mounted in opposite sides of the support plate or other portions of the toolhead are combination handles and rotary control valves by which the operator regulates and manipulates the toolhead. A source of fluid pressure is connected to each rotary control valve. Rotating one handle regulates and allows fluid pressure into the fluid cylinder to feed the grinding wheel or tool. The other handle when rotated directs fluid under pressure into the composite cable to inflate the resilient tube and separate the wires after which the composite cable can be flexed to reposition the toolhead and then rigidified to retain that position. A flexible cable may be attached to a closed end of the composite cable suspended between guide rollers mounted on the support means and the flexible cable extending over a guide pulley to a counterbalancing weight for easily positioning the toolhead.

It is therefore the primary object of the invention to provide an easily, manually operated, positioned, and highly mobile apparatus, such as a snagging grinder, for power feeding a tool into working engagement with a workpiece and which is much less physically demanding on the operator.

Another object of the invention is to provide apparatus with toolhead such as a grinding head, attached to an unsupported end of a composite cable which can be made flexible for positioning the toolhead and rigidified to retain the position of the tool for power feeding the tool.

BRIEF DESCRIPTION OF THE DRAWINGS

FIG. 1 is a side elevation view of a snagging grinder, shown as an example of one of the many possible embodiments of the invention, suspending from an overhead support and positioned adjacent a workpiece rigidly supported in a work holder;

FIG. 2 is a partial horizontal sectional view through the handles and control valves taken along line 2—2 of FIG. 1;

FIG. 3 is a partial vertical sectional view through the pivotable mounting taken along line 3—3 of FIG. 1;

FIG. 4 is a sectional view through one of the control valves taken along line 4—4 of FIG. 2;

FIG. 5 is a sectional view through another control valve taken on line 5—5 of FIG. 2;

FIG. 6 is a cross-sectional view through the composite cable taken on line 6—6 of FIG. 1;

FIG. 7 is a partial and broken longitudinal sectional view through the composite cable;

FIG. 8 is a plan view of the work holder without the workpiece shown in FIG. 7; and FIG. 9 is a cross-sectional view through a modified form of the composite cable.

DESCRIPTION OF THE PREFERRED EMBODIMENT(S)

Referring to the drawings wherein there is shown an apparatus such as snagging grinder 10 shown as one example of the many types of apparatus to which the instant invention pertains. The apparatus or grinder 10 is preferably used with a work holder H shown and more fully disclosed and claimed in a copending application. The work holder can be used to hold irregularly shaped workpieces adjacent many types of apparatus other than the snagging grinder 10 shown by way of example. Briefly the work holder comprises a bed of ferromagnetic particles P, into which a workpiece such as a casting C is partially embedded and contained between opposite pole pieces N and S of a magnet M. A source of fluid under pressure such as air is admitted to fluidize the bed of mobilized ferromagnetic particles P allowing castings of various shapes to be easily and quickly partially embedded or reoriented in the bed. Thereafter the air is turned off and the magnet produces a magnetic field immobilizing the ferromagnetic particles into a rigid mass supporting the casting C.

The apparatus or snagging grinder 10 shown by example is in this instance suspended from an overhead support means analogous to an inverted A-frame comprising a horizontal beam 12 normally supported by the structure or building in which the grinder or apparatus resides. The beam 12 could also be supported on rollers whereby the grinder could be traversed relative to the supporting structure and the workpiece. A pair of downwardly extending rails 14 such as angle irons are fixed, as by welding or bolting, one end portion of the rails to the beam 12. The spaced rails 14 converge toward one another and are connected at their lower opposite ends by a plate 16 fixed as by welding its opposite edges or side portions to the rails 14. Between the rails on the beam 12 is rotatably mounted a guide pulley on an axle or shaft 20 fixed to the beam 12. On the plate 16 are rotatably mounted a plurality of spaced guide rollers 22 on axles or studs 24 fixed to the plate 16 and which together provide support means including a guideway thereon.

A flexible cable or rope 26 extends over the guide pulley 18 and is attached at one end to a counterbalancing weight 28. The flexible cable is attached at its opposite end to an upper closed end of a composite cable, or rope 30 extending longitudinally downwardly between the spaced guide rollers 22 and beyond the guideway.

The composite cable 30 has a longitudinally extending axis and comprises preferably a flexible outer resilient tube or casing 32 of predetermined length and made of suitable round plastic or rubber tubing of sufficient wall thickness. Clamped within and closing off one end or upper end of the outer casing or tube 32 is a male adapter or plug 34 having a hook eye to which the cable 26 is attached. Clamped within the opposite end or lower end of the outer casing or tube 32 is a portion of a male adapter or coupling 36 having a fluid passage 36a therein.

Within the central opening of the outer tube 32 is another flexible inner resilient tubular casing or tube 38 expanded around a bundle of flexible wire strands or rods 40 extending longitudinally and substantially parallel to each other between the plug 34 and the coupling 36. Preferably the inner resilient flexible tube is made of suitable resilient round plastic or rubber tubing having an initial inner diameter and cross-sectional area less than that of the bundle of wire strands 40. The inner tube 38 is expanded radially about the bundle of rods 40 as by stretching or expanding the tube over a larger bundle of wires or by inserting a sufficient number of the wires or rods 40 within the tube 38. Also the tube can be first closed off at one end and expanded by introducing compressed air into the other end and then inserting the strands. Hence, the natural resiliency and contraction of the tubing material places the bundle of flexible wires in radial compression which forces the wires into frictional engagement with one another. As a result the compressed bundle of wires acts similar to a solid shaft or rod and likewise has greater resistance to forces tending to flex or bend them. Flexible wires or rods of generally circular cross section and made of high tensile strength material with a high coefficient of friction is preferred. For example, the bundle may be made up entirely of steel wire strands or a mixture of steel and copper wires or rods, or of copper coated steel wire or rod. The selection of the specific materials and their dimensions for making a suitable composite cable depends upon the amount of rigidity required to resist the grinding pressures exerted.

In some applications it may be necessary and preferable to provide more resilient compressive force to make a more rigid composite cable. One method of increasing the radial compressive force is to wind or wrap a suitable length of resilient material, such as plastic, or rubber cord or a coil spring 42 as shown, tightly in tension, by stretching it around the entire length of the inner resilient tube. Both ends of the resilient cord or coil spring 42 being preferably fixed in any suitable conventional way to the wall at opposite ends of the inner tube 38.

As shown in FIG. 6 and 7 the coil spring 42 is stretched tightly in a plurality of helical spaced turns around the inner tube 38 and the bundle of wire 40 therein. The coil spring is of a predetermined diameter and occupies the space between the inner and outer flexible casings or tubes 32 and 38. Each complete turn or coil of the spring 42 is spaced from another turn or coil and has substantially point contact with the walls of the tubes 32 and 38. Frictional engagement is greatly reduced and there is room for relative movement between the coils or turns of the spring when it becomes necessary to expand the inner tube, fluidize the bundle, and separate the wires in order to flex or bend the composite cable.

A modified form of the composite support cable 30 is shown in FIG. 9 having only one resilient flexible tube or casing 32 expanded around a bundle of the strands 40. One or both opposite ends of the composite may be closed and sealed against the passage of fluid therefrom, in any suitable manner. It is preferred to close one end of the tube 32 and allow the passage of fluid into and out of the opposite end as disclosed above. However, it is obvious that both ends could be suitably sealed and the fluid under pressure could be introduced into the tube between the ends thereof.

The following procedure may be utilized to construct a composite cable for a specific requirement. It is an approximate procedure in that it assumes the strands of wires are compacted, or compressed as by swagging into a compact core or bundle in which there are no voids. This is usually not practical and the figures arrived at for the outside diameter of the core or bundle of strands must be increased by about 50 percent and the diameter of the strands or wires decreased by 50 percent.

In the following example the symbols used are:
$F$ = force in pounds applied perpendicularly to the end of the composite cable
$d$ = deflection in inches of unsupported end
$r$ = radius of bundle or core of cable in inches
$r'$ = radius of wire strands
$E$ = modulus of elasticity of the wire strands in pounds per square inch
$L$ = length of the composite cable in inches
$N$ = number of strands
$p$ = pressure exerted by the resilient tube or casing in pounds per square inch
$\mu$ = coefficient of friction of strands on each other.

The calculations in this example will concern a tool or grinding head suspended on a cable or rope having a length $L$ of 48 inches and capable of exerting a 25-pound force $F$ on a grinding wheel with a cylinder feed stroke of 3 inches. Further it is assumed the strands are of steel and that $\mu=0.2$.

The procedure then is as follows:
1. Diameter of bundle or core: The maximum deflection $d$ of the composite rope or cable considered as a solid rod is:

a. $d = 4 F L^3 / 3 E \pi r^4$

Substitution of the above-given values in equation (a) and solving it shows $r = 0.34$ inch or 0.68 inch diameter core or bundle 2. It can be shown that pressure $p$ necessary to make the cable or rope rigid is:

b. $p = 16 F^2 L^2 r' \mu \pi^3 E r^8$

It is assumed further that the air pressure available for pressurizing the rope is 100 pounds per square inch.

Substituting these values in equation (b) and solving it shows $r' = 0.142$ or 0.28 inch diameter for each filament or strand 3. Since the sum of the areas of the filaments or strands must equal the area of the core
   $r^2 = N r'^2$ from which
   $N = 6$ filaments or strands 4. The force required to produce a 3-inch deflection of the cable or rope in its flexible condition is:
   $25/6 = 4.25$ lbs.

The above example is only illustrative. In most practical cases it is desired to bend the rope much more than is shown here and the most useful tool, in general, will have a somewhat larger core diameter and will be composed of a larger number of finer strands.

Means are provided for swiveling and pivoting a toolhead of an apparatus, such as, a grinding head of the grinder 10 in a plurality of directions about axes normal to each other comprising a swivel link or yoke 44 rotatable 360° about the longitudinal axis of the composite cable and axis of a pivot shaft 36b at the lower end of the coupling or adapter 36. Preferably, the link or yoke 44 is of U-shape having a central bearing hole in a crossmember 44a through which the pivot shaft 36a extends and is situated between a shoulder 36c of the adapter 36 and a retainer or collar 46 fixed as by pinning it to the pivot shaft 36b. The pivot shaft 36b being in this instance an integral part of the coupling or adapter 36. Extending downwardly from opposite ends or sides of the crossmember 44a of the link 44 are a pair of spaced arms 44b supporting a fluid pressure actuated toolhead or grinding head 50. The arms 44b have fixed thereto a pair of axially aligned pivot pins 48 each of which extend into axially aligned bearing holes in diametrically opposite sides of a fluid pressured cylinder 52 of the grinding head 50. The axis of the pivot shaft 36a is located substantially in alignment with the axis of the cylinder 52 and perpendicular to the pivot axis of the axially aligned pivot pins 48.

In order that the tool or grinding head can be easily moved by the operator it is substantially balanced about its center of gravity when in the inoperative position shown, by locating the axis of the pivot pins 48 closer to the rear end of the cylinder 52. Obviously the balance about the pivot axis will be disrupted when a tool or a grinding wheel W is fed to its extreme outward position toward the workpiece. However, the toolhead can be balanced to suit the operator by attaching thereto suitable weights on one side or the other of the pivot axis.

The cylinder 52 has a central cylinder bore 52a intermediate its ends and axially aligned bearing bores or holes 52b in opposite or front and rear end portions or caps fixed to the cylinder 52. A piston 54 and axially aligned piston rods or drive shafts 54a and 54b extending from its opposite sides, are slidably and rotatably mounted within the cylinder and the bearing bores. One end of the piston rod 54a is adapted in any suitable and well-known manner with means for fixedly mounting a conventional tool or grinding wheel W thereon. If desired a conventional wheel or tool guard not shown may be fixed in the well-known manner to the grinding or toolhead 50. In the embodiment shown the grinding wheel W is a cup wheel threaded onto the piston rod 54a and up against a flange-type lock not thereon. The opposite end portion of piston rod 54b is connected by a suitable conventional drive coupling 56 to the input or drive shaft 58 of a power driven motor MT fixed to a slide support block or plate 60 slidably mounted in a slideway 52c on the cylinder 52.

The motor MT may be any conventional and commercially available type of drive motor but is preferably a fluid pressured motor driven by a source of compressed air readily available in most factories and foundries. Suitable air-driven motors are commercially available from many sources one of which is the Ingersoll-Rand Company, New York, N.Y.

Means are provided for retracting the tool or grinding wheel W, the piston 54, and the motor MT to an inoperative position as shown. The retracting means may comprise a slide or guide rod 62 fixed at one end to the slide or support block 60. The slide rod 62 extends substantially parallel to the axes of the piston 54 and the piston rods 54a and 54b from the support block 60 and through a bearing in the slideway or guideway 52c adjacent the rear end of cylinder 52. Resilient means, such as, a coil spring 64 extends around the guide rod between the rear end of the cylinder 52 and the slide or support block 60.

Means are provided for an operator to manually hold direct, position, and actuate the tool or grinding head 50 comprising a pair of handles 66 and 68 rotatably mounted in valve chambers 60a and 60b in opposite side portions of the support block 60. As shown, the handles 66 and 68 are substantially in axial alignment, extend outwardly from the support block, and have a groove in adjacent rotary control valve portions 66a and 68a in the valve chambers 60a and 60b. One or more retaining pins, suitably fixed to the support block, extend through the walls thereof and into the grooves in valve portions 66a and 68a of the handles. Thus, the handles can be rotated but prevented from axial movement relative to the slide or support block 60. However, the handles could be located in any suitable place on the toolhead. For example, they could extend from opposite sides of the cylinder or be an extended integral part of the pivot pins 48.

In FIG. 4 and 5 are more clearly shown the rotary control valve portions 66a and 68a and the various inlet and outlet ports associated therewith. The control valve portion 66a in the position shown in FIG. 4 has an arcuate groove or recess 66b connecting a fluid pressure inlet port in a pipe or conduit 70 to an outlet port in a conduit 72 comprising suitable conventional fittings and a flexible hose extending and connected to the inlet passage 36a in the coupling or adapter 36. Admitting fluid under pressure into the passage 36a and hence the spaces between the wires 40 expand the rigidized bundle of wires 40 and the tubes 32 and 38, and the coil spring 42. The wires 40 are separated, no longer in frictional engagement, and have their initial flexibility. As a result the normally rigidified composite cable is fluidized and flexible. Now the operator can move or shift the grinding head to the desired grinding position adjacent the workpiece or casting C. Upon rotating the handle 66 the supply of fluid pressure is cut off to allow the resilient tube 38 and the coil spring to contract, and rigidify the composite cable 30 in the desired flexed position. Contraction of the bundle of wires 40 exhaust fluid therefrom through the conduit 72, the now rotated groove or recess 66b, and out an outlet port 66c in the valve chamber 60b in the support block 60.

Another recess or groove 66d in the valve portion 66a, in the position shown in FIG. 4, connects a port in a pipe or conduit 74, made up of conventional fittings and a flexible hose connected to the cylinder bore 52a, to an exhaust port 66e. Fluid is exhausted from the cylinder bore by the piston 54 which is forced rearwardly by the action of the spring 64. When the handle 66 is rotated clockwise, as viewed in FIG. 4, the grooves 66b and 66d are likewise rotated relative to the support block 60. The amount of rotational movement being predetermined and limited by the engagement between suitable conventional abutments or stops provided therein. After rotating the handle 66 clockwise as indicated above groove or recess 66d connects the fluid pressure inlet port in conduit 70 with the conduit 74. Thus fluid under pressure enters the cylinder bore 52a, advances the piston 54 and feeds the tool or grinding wheel under pressure into working engagement with the workpiece C. The composite cable attached to the cylinder 52 is now in a rigid state and effectively resists being bent excessively out of position by the force, exerted between the piston 54 and the cylinder 52. However, the rigid composite cable 30 like any solid shaft anchored at one end in cantilever fashion can be bowed or flexed various amounts, by applying varying amounts of force either at the extreme free end or at various points along their length. Therefore, it is obvious that the cross-sectional size or area and length of the rigid composite cable must be calculated to resist and prevent the force exerted from permanently bending the rigidified cable beyond its elastic limit. Also, the area of the piston can be calculated to provide a sufficient force to feed the grinding wheel without exceeding the elastic limit whereby the bowed or flexed composite cable will spring back upon reducing the force.

When the tool or grinding wheel W is power fed the applied force is multiplied due to the length of the resisting rigidified composite cable 30. The increased force is transmitted through the guide rollers 22 of the guideway to the strong inverted A-frame of the support means and the supporting structure.

Means are provided for operating the fluid pressure driven motor MT comprising a groove or recess 68b in the rotary control valve portion 68a of handle 68. The arcuate groove or recess 68b in the position shown in FIG. 5 connects a port in a pipe or conduit 76, made up of suitable conventional fittings, connected between the support block 60 and the inlet side of the motor MT, to an exhaust port 68c. The exhaust port 68c may in some instances be eliminated and unnecessary for proper motor operation. Another inlet port in a pipe or conduit 78 connected to a source of fluid under pressure, is blocked. Upon rotating the handle 68 and the valve portion 68a clockwise, as viewed in FIG. 5, the recess 68b is likewise rotated to connect the ports in the pipes or conduits 76 and 78. Fluid under pressure then passes to and drives the motor MT to rotate the grinding wheel W and the fluid exhausts from the motor MT in the conventional well-known manner, not shown.

As shown in FIG. 3 the conduits 70 and 78 are connected at one end to the rotary control valve chambers 66a and 68a respectively and at the opposite ends to a tee fitting 80. The fitting 80 is connected at one end to a conduit 82 comprising suitable conventional fittings and a flexible hose of sufficient length connected to a conventional flow control valve V. Valve V is connected to a supply pipe 84 connected to a source of fluid under pressure which is preferably compressed air. By manipulating the valve V is the well-known manner the volume of fluid flow can be regulated or shut off as desired.

The supply pipe 84 is also connected to a conduit which supplies the fluid under pressure to the various conduits and controls means for operating the work holder H more fully disclosed and claimed in the above-mentioned copending application.

OPERATION

The flow control valve is turned on and adjusted to supply a suitable volume of air pressure to operate. With the valve in the position shown, air enters and fluidizes the composite cable 30. The operator after securing the workpiece or casting C in the work holder H or any other suitable work holder, raises or lowers the tool or grinding head 50 to the proper height above the floor relative to the portion of the casting to be ground. He then positions himself to the rear or to the right of the motor MT as viewed in FIG. 1 and grasps both of the handles 66 and 68. Facing the casting C he then positions the tool or grinding wheel W closely adjacent the area of the workpiece or casting to be engaged or ground, by pushing forward an flexing the fluidized cable. Obviously that distance must be less than the axial grinding wheel or tool feed stroke of the piston 54 relative to the cylinder 52 in order to engage the workpiece. When positioned the operator rotates the left and right handles 66 and 68 to defluidize and rigidify the composite cable 30, rotate and feed the grinding wheel axially into the workpiece. As the operator rotates the handle 66, the control valve 66a first blocks off the pressure. Soon thereafter the recess 66b moves a short distance to exhaust fluid from the composite cable before the recess 66d has moved approximately two-thirds the distance to the edge of the port in pipe 70. Fluid is therefore completely exhausted from the composite cable 30 before the tool or grinding wheel W is fed. Upon rotating the handle 66 further the recess 66d uncovers the entire area of the port in pipe 70 and the recess 66d extends slightly beyond and blocks the exhaust port 66e but allows fluid into pipe 74 to feed the grinding wheel W. However, by rotating the handle 66 back and forth short distances from this position the grinding wheel feed can be stopped and started without affecting the rigidity of the composite cable. The cable can only be fluidized by rotating the handle to substantially the opposite and initial starting position. During the grinding of the casting the operator can, if he desires, exert some of his strength to argument the rigidified composite cable 30. He can also fluidize the cable and manually flex the cable, to feed the tool or grinding head 50 when removing small amounts of material. The operator can simultaneously feed, swivel, and pivot the tool or grinding wheel W easily into various positions in order to reach different portions of the workpiece or casting.

As disclosed the invention provides a snagging grinder or other apparatus with a unique composite support cable attached to a tool or grinding head enabling a tool or grinding wheel to be fed under fluid pressure; and wherein the composite cable can be made flexible to reposition the tool or grinding head and rigidified to maintain it in position.

Although the invention has been illustrated, by example, as a snagging grinder or apparatus supported above a floor and extending downwardly from an overhead support means, it is obvious that the apparatus could be arranged and supported to extend horizontally, upwardly, outwardly, and angularly from the support means. For example, the closed end of the composite cable shown attached to the flexible cable 26 could be anchored to the floor so that the composite cable 30 extends longitudinally upwardly normal to or at an angle to the floor with the toolhead on top and still above the floor.

Another example, is that the support means including the guideway could be attached to a supporting structure so that the composite cable 30 extends longitudinally outward therefrom, either horizontally or at an angle above the floor. In some of these positions the counter balancing means is unnecessary since the apparatus is not elevated or lowered in the same manner. The weight of the toolhead is supported in this case by the rigidified composite cable and the operator when the cable is made flexible. However, this type of arrangement would be used preferably to support rather light tool feeding heads.

It is evident that numerous other types of apparatus not mentioned herein can be constructed to utilize the teachings of this invention. For example, many well-known types of work performing toolheads can be adapted to be supported by and connected to a composite cable made and used in the manner taught herein. However, it is obvious that the composite cable taught herein is most useful when utilized to support manually operated toolheads having means to pressure feed and/or drive the tool and relieve the operator of that laborious chore.

It is to be understood that many modifications may be made of the embodiments of the invention disclosed hereinabove without departing from the spirit of the invention and which modifications are within the scope of the appended claims.

1. An apparatus adapted to be supported and suspended above a floor of a supporting structure, held, positioned, and actuated by an operator for forcing a tool into engagement with a workpiece comprising:

a composite cable having a longitudinal axes, a closed end, a portion attached to and supported by the supporting structure and an unsupported portion extending longitudinally above the floor from and beyond the supporting structure to an unsupported end, comprising a bundle of flexible strands extending longitudinally about the longitudinal axes between the ends of the composite cable, a resilient flexible tube expanded around and compressing the bundle of strands radially together into sufficient frictional engagement with one another to substantially eliminate relative movement between the strands, and rigidifying the bundle of strands and the composite cable sufficiently to resist a predetermined amount of bending force applied at the unsupported end of the composite cable for power feeding a tool;

a toolhead adapted to be held, positioned, and actuated by the operator, attached to the unsupported portion of the composite cable, comprising means for supporting and power feeding the tool into and out of engagement with the workpiece relative to the composite cable; and means, actuated by the operator, for selectively supplying fluid under pressure into the resilient tube to make the composite cable flexible and for exhausting fluid under pressure from the resilient tube to rigidify the composite cable;

whereby the resilient flexible tube and the bundle of strands are expanded and fluidized, the stands separated and allowed to move relative to each other, the operator can flex the composite cable to position the tool adjacent the workpiece and rigidify the flexed composite cable to retain the position of the tool and resist the force applied to feed the tool relative thereto.

2. An apparatus according to claim 1 wherein the composite cable further comprises:
a flexible resilient member tensioned around and radially compressing the resilient flexible tube and the bundle of flexible strands together.

3. An apparatus according to claim 1 further comprising:
pivot means for attaching the unsupported end of the composite cable to the toolhead and pivoting the toolhead relative to the composite cable about a pivot axis normal to the longitudinal axis of the composite cable.

4. An apparatus according to claim 1 further comprising:
swivel means for attaching the unsupported end of the composite end cable to the toolhead and swiveling the toolhead relative to the composite cable about the longitudinal axis of the composite cable.

5. An apparatus according to claim 1 further comprising:
power drive means, on the toolhead, for rotatably driving the tool relative to the toolhead.

6. An apparatus according to claim 2 wherein the composite cable further comprises:
a second resilient flexible tube extending around and radially compressing the flexible resilient member, the first-mentioned resilient flexible tube, and the bundle of flexible strands together.

7. An apparatus according to claim 4 further comprising:
pivot means for pivotally attaching the swivel means to the toolhead and for pivoting the toolhead relative to the swivel means and the composite cable about a pivot axis normal to the longitudinal axis of the composite cable.

8. An apparatus according to claim 7 further comprising:
support means, including a guideway, attached to the supporting structure for guiding and supporting a portion of the composite cable; and
wherein the composite cable is moveable longitudinally relative to the guideway to vary the position of the toolhead.

9. An apparatus according to claim 8 further comprising:
power drive means, on the toolhead, for rotatably driving the tool relative to the toolhead;
control means, including handles on the toolhead, for the operator to hold and position the toolhead, to actuate the power drive means, the means for power feeding the tool, and the means for supplying fluid under pressure to the composite cable.

10. An apparatus according to claim 9 wherein the means for supporting and power feeding the tool into the out of engagement with the workpiece comprising:
a fluid pressure cylinder having
a front end portion including a bearing hole aligned with a central axis of the cylinder,
a rear end portion opposite the front end portion of the cylinder,
a cylinder bore extending between the front and rear portions in axial alignment with the bearing hole and the central axis;
a piston movable in the cylinder bore;
a piston rod extending from a front side of the piston, through the aligned bearing hole and beyond the front end portion;
means, on a portion of the piston rod extending beyond the front end portion for attaching the tool.

11. An apparatus according to claim 10 wherein the power drive means comprises:
a rotatable drive shaft coupled at one end to the piston rod and extending from a rear side of the piston, opposite the front side, through and beyond an axially aligned bearing hole in the rear end portion of the cylinder, and
a fluid pressure operated drive motor coupled to the drive shaft.

12. An apparatus according to claim 11 further comprising:
counterbalancing means, attached to the closed end of the composite cable and in supporting engagement with the support means, for easily moving and maintaining the position of toolhead relative to the support means; and
a grinding wheel rotatably mounted on the toolhead.

* * * * *